United States Patent
Mp

(10) Patent No.: US 11,294,860 B2
(45) Date of Patent: Apr. 5, 2022

(54) SECURE DECOMPRESSION

(71) Applicant: SAP SE, Walldorf (DE)

(72) Inventor: Deepak Mp, Bangalore (IN)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 16/002,333

(22) Filed: Jun. 7, 2018

(65) Prior Publication Data

US 2019/0377803 A1 Dec. 12, 2019

(51) Int. Cl.
| | |
|---|---|
| *G06F 17/30* | (2006.01) |
| *H03M 7/30* | (2006.01) |
| *G06F 16/14* | (2019.01) |
| *G06F 16/13* | (2019.01) |

(52) U.S. Cl.
CPC ............ *G06F 16/152* (2019.01); *G06F 16/13* (2019.01); *H03M 7/6005* (2013.01)

(58) Field of Classification Search
CPC .. G06F 16/152; G06F 16/13; G06F 17/30109; G06F 17/30091; H03M 7/6005
See application file for complete search history.

(56) References Cited

U.S. PATENT DOCUMENTS

| | | | | |
|---|---|---|---|---|
| 6,678,828 B1* | 1/2004 | Pham | ............ | G06F 3/0622 |
| | | | | 726/2 |
| 8,296,312 B1* | 10/2012 | Leung | ............ | G06F 16/152 |
| | | | | 707/760 |
| 2001/0024568 A1* | 9/2001 | Mori | ............ | G11B 20/00007 |
| | | | | 386/239 |
| 2006/0143691 A1* | 6/2006 | Peterson | ............ | H04L 9/3231 |
| | | | | 726/2 |
| 2014/0068254 A1* | 3/2014 | Scharf | ............ | G06F 21/6218 |
| | | | | 713/165 |
| 2014/0157426 A1* | 6/2014 | Paek | ............ | G06F 21/6245 |
| | | | | 726/26 |
| 2017/0235752 A1* | 8/2017 | Shih | ............ | G06F 16/16 |
| | | | | 707/693 |

\* cited by examiner

*Primary Examiner* — Syed H Hasan
*Assistant Examiner* — Chongsuh Park
(74) *Attorney, Agent, or Firm* — Buckley, Maschoff & Talwalkar LLC

(57) ABSTRACT

A method and system including receiving a main input stream for a compressed file at an application server, wherein the main input stream includes two or more file streams; extracting a file-type extension from each file stream input stream; determining the file-type extension is supported; determining, for each file stream with the supported file-type extension, a signature for the file stream with the supported file-type extension is valid; determining, for each valid file stream, a size of the file is less than a threshold level; and storing the valid file stream on a storage device when the size of the file is less than the threshold level. Numerous other aspects are provided.

20 Claims, 4 Drawing Sheets

SECURE DECOMPRESSION

BACKGROUND

A cloud integration platform facilitates the integration of an organization's onsite (e.g., non-cloud-based) application program resources with other (e.g., cloud-based) resources. The integration may allow diverse applications to communicate and share data and processes. During integration, an on-site application may have multiple files to be simultaneously uploaded to another application server. These files may be compressed prior to upload.

After these compressed files are uploaded and received at the other application server, they may be decompressed before the contents of the compressed file may be verified. Decompression may result in files being uploaded to the other application server that the other application server did not intend to receive.

Systems and methods are desired which support verification of the contents of compressed files.

DETAILED DESCRIPTION

Figure 1:
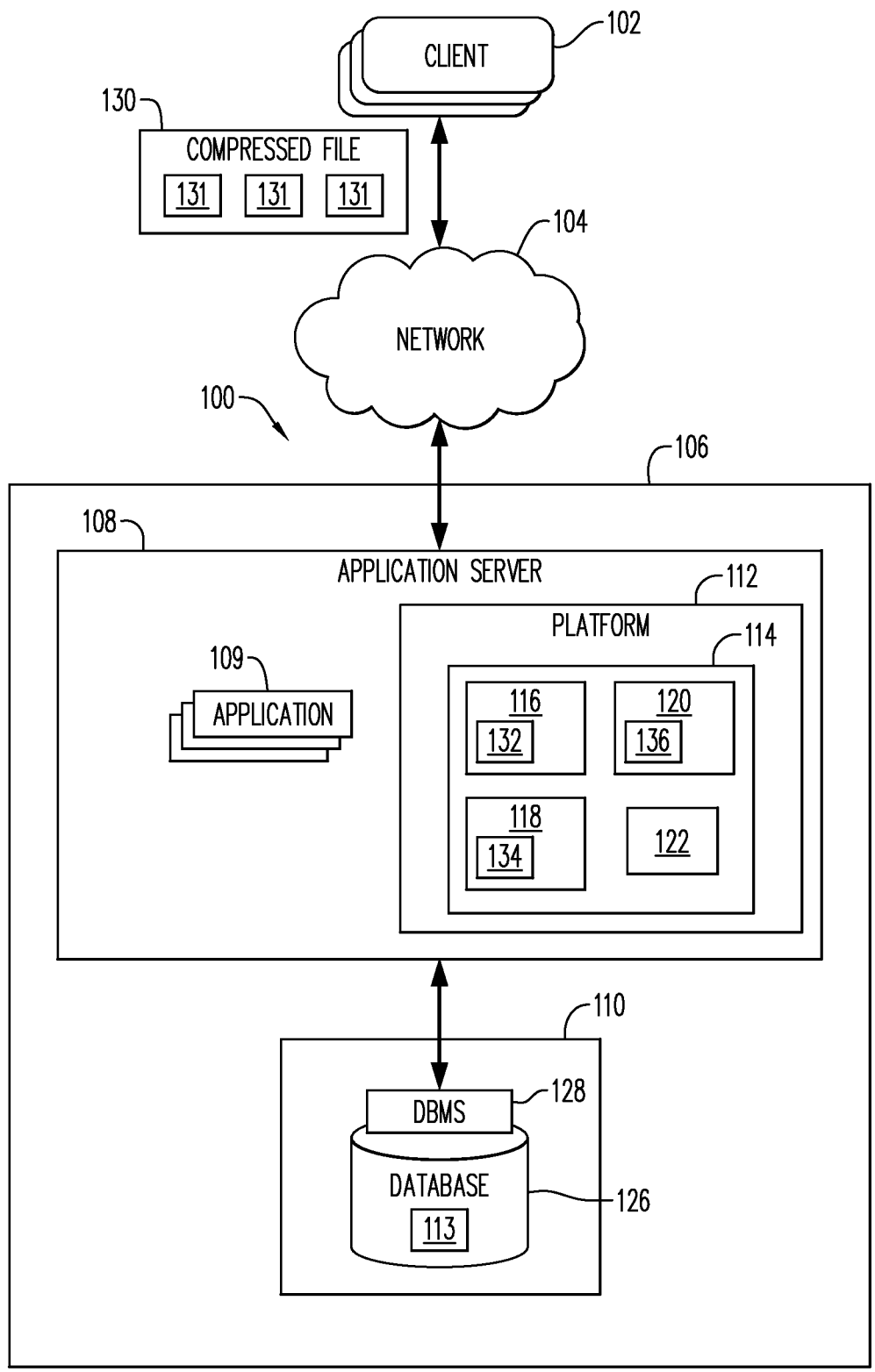
FIG. 1 is a block diagram of a system architecture according to some embodiments.

The following description is provided to enable any person in the art to make and use the described embodiments, and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

During integration of an organization's onsite (e.g., non-cloud-based) application program resources with other application (e.g., cloud-based) resources, an application may be uploaded to the other application server that includes multiple files. The multiple files may be compressed (e.g., "zipped") into a single file before being uploaded so that they may be uploaded at the same time. The decompression ("unzipping") of this file at the other application server to access the multiple files may present several challenges for the other application server. First, unwanted files may be compressed and uploaded together with files that the other application server expects and are relevant for the application. For example, the other application server expects .xml, .xsd and .pdf files to be compressed and uploaded via the client. However, a user may zip .xml, .xsd, .pdf, .mp4 and .mp3 files together into a compressed file and upload the compressed file to the other application server. In this example, the .mp3 and .mp4 files may not be relevant for the other application server.

Second, a client may rename unwanted or potentially harmful files to have names the other application server expects, and then upload these renamed files to the other application server. For example, the other application server may expect .xml, and .xsd. A client may rename an .mp4 to an .xml and/or an mp3 to an .xsd, zip these renamed files and upload the compressed file. If one of these renamed files is a virus, for example, it may replicate itself once it is decompressed on the other application server. With respect to the first and second challenges, these features may be exploited by hackers and mal-doers to upload vulnerable (i.e. virus) or infected files that may cause problems for the other application server.

Finally, while large files may be compressed and uploaded to the other application server, after decompression, these files may take up a lot of hard disk space, which may result in denial of service for other files. For example, a 1 Gb file may be compressed (zipped) to the size of 18 mb, but when decompressed, these files retain their original size of 1 Gb.

Embodiments provide for a decompression module to address the challenges described above. In one or more embodiments, the compressed file may attempt to pass through several modules of the decompression module before the compressed file is permitted to be stored on the other application server. In one or more embodiments, the process of passing through the decompression module occurs without storing the compressed files on the physical storage. A benefit of embodiments is that unwanted and vulnerable files may be discarded even before they are stored on to the physical storage. The decompression module may include a file extension module, a file type detector module and a file size checker module. The file extension module may determine whether the file is one expected by the other application server. A file type detector module may detect content of file types and validate the files by using a file type parsing process. A file size checker module may determine whether the file size matches a pre-defined threshold. In one or more embodiments, when the decompressed file is rejected by a module, the file is discarded, and not permitted to continue to the next module.

FIG. 1 is a block diagram of system architecture 100 according to some embodiments. Embodiments are not limited to architecture 100.

Architecture 100 includes a client device 102, a network 104, and a cloud storage system 106. It is noted that while a cloud storage system 106 is described herein as a target system, any suitable target system may be used. The client device 102 may comprise one or more devices used by an organization during operation thereof. The client device 102 may upload one or more application files to the cloud storage system 106 for integration with application files stored thereon, and/or for execution thereon. For example, the client device 102 may be a desktop computer or a laptop. The client device 102 may comprise one or more individuals or devices executing program code of a software application for uploading compressed files onto an application server 108.

The network 104 may comprise an intranet, an internet such as the World Wide Web, a local area network (LAN), a wide area network (WAN) or a metropolitan area network (MAN). The network 104 may provide for communication between the client device 102 and the cloud storage system 106.

The cloud storage system 106 may comprise any cloud-based architecture where data is stored in logical pools while physical storage spans multiple application servers 108 (only one of which is shown herein), and in some embodiments, multiple locations. Each application server 108 may be associated with a storage device 110 and each application server 108 may communicate with each other.

The application server 108 may include applications 109 and a platform 112. The platform 112 may store a decompression module 114, a file extension module 116, a file content type detector module 118, a file syntactic analyzer module 120 and a file size checker module 122. The storage device 110 may include a database 126 and a database management system (DBMS) 128. Applications 109 may comprise server-side executable program code (e.g., compiled code, scripts etc.) executing within application server 108 to receive compressed files 130 from clients 102 and queries from clients 140 and provide results to clients 140 based on data of storage device 110. In one or more embodiments, the decompression module 114 may receive a compressed file 130 from a client 102, and may provide the contents of that compressed file 130 to the physical storage 110 for storing.

Application server 108 provides any suitable interfaces through which clients 102 may communicate with the cloud storage system 106, applications 109, and decompression module 114 executing on application server 108. For example, application server 108 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 109 executing on application server 108 may communicate with the DBMS 128 using database management interfaces such as, but not limited to, Open Database Connectivity (ODBC) and Java Database Connectivity (JDBC) interfaces. Some of these types of applications may use Structured Query Language (SQL) to manage and query data stored in database 126.

DBMS 128 serves requests to retrieve and/or modify data of database 126, and also performs administrative and management functions. Such functions may include snapshot and backup management, indexing, optimization, garbage collection, and/or any other database functions that are or become known. DBMS 128 may also provide application logic, such as database procedures and/or calculations, according to some embodiments. This application logic may comprise scripts, functional libraries and/or compiled program code.

Application server 108 may be separated from, or closely integrated with, DBMS 128. A closely-integrated application server 108 may enable execution of server applications 109 completely on the database platform, without the need for an additional application server. For example, according to some embodiments, application server 108 provides a comprehensive set of embedded services which provide end-to-end support for Web-based applications. The services may include a lightweight web server, configurable support for OData, server-side JavaScript execution and access to SQL and SQLScript.

Application server 108 may provide application services (e.g., via functional libraries) which applications 109 may use to manage and query the data of database 126. The application services can be used to expose the database data model, with its tables, hierarchies, views and database procedures, to clients. In addition to exposing the data model, application server 108 may host system services such as a search service.

Storage device 110 may store data used by at least one of: applications 109, and the decompression module 114. For example, storage device 110 may store configuration files 113 that may be used by the decompression module 114 to determine whether the individual files in the compressed file may be stored in the storage device 110.

Storage device 110 and/or database 126 may comprise any query-responsive data source or sources that are or become known, including but not limited to a structured-query language (SQL) relational database management system. Database 126 may comprise a relational database, a multi-dimensional database, an eXtendable Markup Language (XML) document, or any other data storage system storing structured and/or unstructured data. The data of database 126 may be distributed among several relational databases, dimensional databases, and/or other data sources. Embodiments are not limited to any number or types of data sources.

In some embodiments, the data of database 126 may comprise one or more of conventional tabular data, row-based data, column-based data, and object-based data. Moreover, the data may be indexed and/or selectively replicated in an index to allow fast searching and retrieval thereof. Database 126 may support multi-tenancy to separately support multiple unrelated clients by providing multiple logical database systems which are programmatically isolated from one another.

Storage device 110 and/or database 126 may implement an "in-memory" database, in which volatile (e.g., non-disk-based storage) (e.g., Random Access Memory ("RAM")) is used for both cache memory and for storing the compressed file during operations (e.g., Process 200, described below). The full database may be persisted in and/or backed up to fixed disks in storage device 110. Embodiments are not limited to an in-memory implementation. For example, data may be stored in Random Access Memory (e.g., cache memory for storing recently-used data) and one or more fixed disks (e.g., persistent memory for storing their respective portions of the full database). It is noted that when the size of an input stream is too large to be stored in-memory, the input stream may be stored on disk before validation. It is also noted that validated file streams may be written to disk as files.

FIGS. 2-4b include a flow diagram of a process 200 (FIG. 2), a table 300 (FIG. 3), and non-exhaustive examples of input streams (FIGS. 4A/4B) described with respect to the system 100 according to some embodiments. Process 200 may be executed by application server 108 according to some embodiments, e.g., by execution of the decompression module 114 to determine whether a file may be stored in the storage device 110. In one or more embodiments, the application server 108 may be conditioned to perform the process 200, such that a processor 510 (FIG. 5) of the server 108 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Any user interface used herein by the client 102 may be presented on any type of display apparatus (e.g., desktop monitor, smartphone display, tablet display) provided by any type of device (e.g., desktop system, smartphone, tablet computer).

Figures 2, 3:
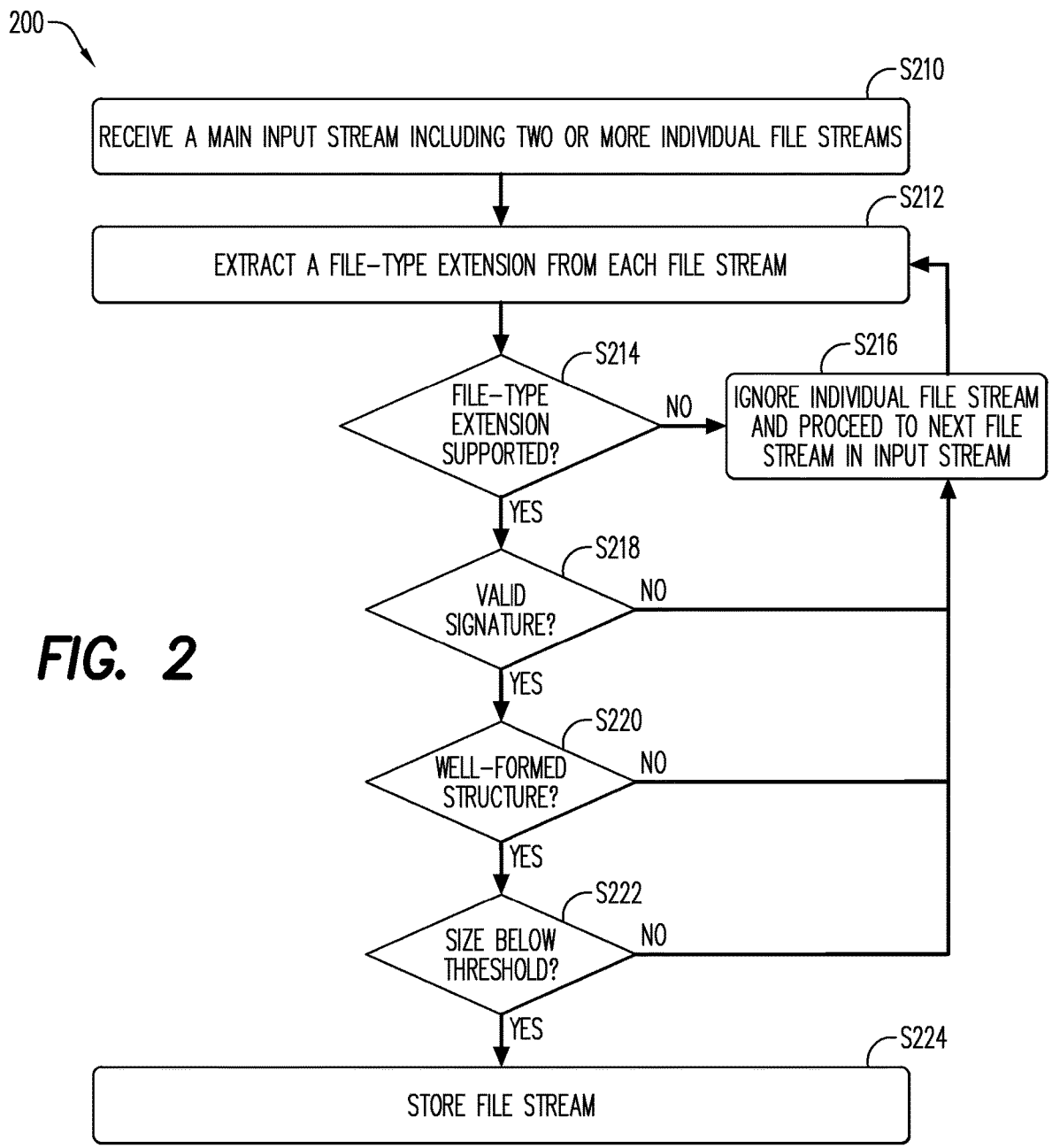
FIG. 2 is a flow diagram of a process according to some embodiments.
FIG. 3 is non-exhaustive example of a configuration table according to some embodiments.
Figure 4A:
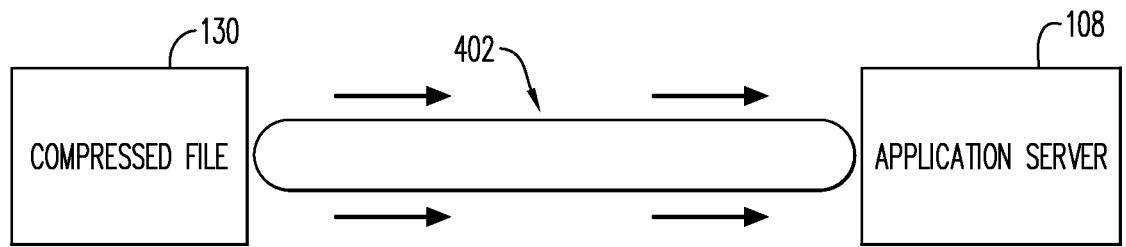
FIGS. 4A and 4B are non-exhaustive examples of input streams according to some embodiments.
Figure 4B:
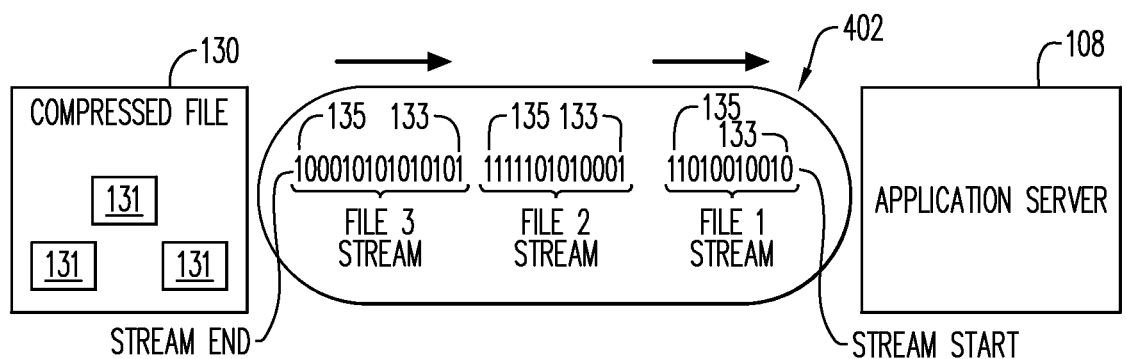

Prior to the start of process 200, a configuration file 300 (FIG. 3) is created by at least one of a system administrator and another system. The configuration file 300 may define the parameters 302 for the files that may be acceptable to the application server 108. As shown in FIG. 3, in one or more embodiments, parameters 302 may include a file extension 304, a file type 306, a file syntax 308 and a file size 310. Other suitable parameters 302 may be included in the configuration file 300. In one or more embodiments, the configuration file 300 may be populated with values 312 for one or more of the parameters 302. The configuration file 300 may be stored in the storage device 110 and accessed by the decompression module 114, as described below.

Initially at S210, a main input stream 402 (FIG. 4A/4B) for a compressed file 130 is received (e.g., the input stream is uploaded). The compressed file 130 may include two or more individual files 131 (FIG. 4B) that have been compressed into the compressed file 130 for transmission at the same time. The compressed file 130 may be transmitted from the main input stream source (e.g., client 102) to the application server 108 at the cloud storage system 106. In one or more embodiments, when the individual files 131 are zipped and uploaded, the compressed file 130 may be a single stream. Each individual file 131 may have a start point 133 and an end point 135 in the single stream. In one or more embodiments, the individual files 131 in the input stream 402 may be a representation of the file itself, so the input stream may include all of the information a file includes. When the application server 108 receives the stream 402, it starts reading the sequence in the stream 402. Each file 131 is represented by a sequence in the stream 402, and may be referred to herein as a "file stream" 404. If any of the file streams 404 in the sequence fail the process, that file stream 404 may be skipped or ignored, and then next file stream 404 in the input stream 402 is read and the process continues, as described further below. When the file stream 404 successfully passes through the process 200, the file stream 404 is written as a file to the physical storage (e.g., hard disk). Since the file stream 404 is stored in memory, it may be removed once the processing is complete. When the single stream/compressed file 130 is received at the application server 108, the single stream may return to a stream of individual files for execution of process 200. The input stream may be used to read data from a source. The main input stream 402 may include two or more individual files 131 represented by file streams 404.

Next, the file extension module 116 extracts a file-type extension 304 from each file stream 404 in S212. In one or more embodiments, an extension parser 132 may parse the file name string by extracting the string after the last dot in the file name. For a file name string of "Test.pdf", for example, the extension parser 132 may parse the string at the dot and extract the extension "pdf". Examples of file-type extensions include xml, pdf, xsd, exe, mp3, mp4, and any other suitable file-type extension.

Then the file extension module 116 determines whether the extracted extension of the uploaded individual file 131 is supported by the application server 108 in S214. In one or more embodiments, the file extension module 116 may verify the extracted extension is supported by the application server 108 by comparing the extracted extension to the extension values 312 in the file extension field 304 in the configuration file 300. When the extracted extension is not the same as one of the extension values 312, the individual file stream 404 is ignored in S216, and the next individual file stream (marked by start and end points 133, 135) is read and processed, with the process returning to S212, as described above, until the entire stream 402 is read.

As a non-exhaustive example, the configuration file 300 includes .xml and .pdf file extension values. The file extension module 116 receives a main input stream 402 that includes three file streams 404, as in S210. The extension parser 132 then parses each file stream name, to extract the extension, as in S212, resulting in three extensions: .xml, .pdf. and .exe. The file extension module 116 then compares each extracted extension to the configuration file 300 and determines that the .exe file extension is not in the configuration file 300, and therefore not supported by the application server 108, per S214. The file extension module 116 then ignores the individual file stream 404, marked by the start point 133 and end point 135, for the file with .exe extension in S216.

When the extracted extension is the same as one of the extension values, the individual file stream 404 is passed to the file content type detector module 118, where the file signature is verified in S218. A file signature is data used to identify or verify the contents of a file. Each file type may have a corresponding signature (or header) that may be recognized by the program the file belongs to. For example, for a file with a .DOC extension, it is expected that a program like Microsoft Word would open this file. One tactic to try to hide data is to change the file extension on a file, or to remove the extension altogether. Performing a signature analysis via the file content type detector module 118 according to one or more embodiments, may identify which files may have been altered to hide their true identity. Verification of the signature may include determining whether the content type of the individual file steam 404 corresponds to the extracted extension. As a non-exhaustive example, the file content type detector module 118 may use Apache Tika™, or any other suitable signature verification process, to verify the signature via the input stream. In one or more embodiments, the file content type detector module 118 may accept the input stream as input to detect file types. As noted above, the input stream may be a representation of the files themselves, so the input stream may include all of the information each file includes.

In one or more embodiments, the file content type detector module 118 may include a detector and content extractor 134. The detector and content extractor 134 may include one or more parsers (e.g., may include a parser for each file type or a universal parser) and may extract both structured text as well as metadata from different file streams associated with different types of files (e.g., spreadsheets, text documents, images, pdfs, multimedia input formats, etc.). In one or more embodiments, the detector and content extractor 134 may analyze raw bytes of a file per the individual file streams 404, to detect unique character patterns in the individual file streams indicative of the file type, and thereby identify the file type. It is noted that there may be unique character patterns for each type of file. For example, some files may have special byte prefixes called "magic bytes" that may be specially made and included in a file for the purpose of identifying the file type. For example, CA FE BA BE (hexadecimal format) may be the magic byte found in a java file, and % PDF (ASCII format) may be the magic byte found in a pdf file. It is noted that the unique character pattern may be placed in a specific location in the file name, and not just the prefix, and this specific location may be part of the signature. In one or more embodiments, a list of character patterns and corresponding file types may be stored in a library or configuration file.

After the file type is identified, the identified file type may be compared to a library or configuration file to determine whether it corresponds to the extracted extension.

When the file content type does not correspond to the extracted extension in S218, the process 200 proceeds to S216, and the individual file stream marked by the start point 133 and end point 135, is ignored.

When, in S218 the file content type of the individual file stream 404 does correspond to the extracted extension, the process proceeds to S220.

For example, file content type detector module 118 has in its configuration/library file, that an individual file stream 404 should have a % pdf in a particular location in the signature. As such, when the file content type detector module 118 receives an individual file stream 404 with a pdf extension, it analyzes the individual file stream 404 to determine whether the file includes % pdf in the specified location.

In S220, the file syntactic analyzer module 120 determines whether the file stream 404 has the appropriate structure for that detected file type. In one or more embodiments, the file syntactic analyzer module 120 may include a file-type specific parser 136 for each possible file type. The file-type specific parser 136 may analyze a structure of the file stream 404 to determine whether the file is well-formed. As a non-exhaustive example, an XML document may need to have a root tag, and every open tag needs to have a corresponding closing tag. Similarly, each file may have a structure which the file-specific parser 136 validates to determine if the file (e.g., input stream) is well-formed. It is noted that having the appropriate structure is another level of validation that the file 131 is what it purports to be. When the structure is not well-formed in S220, the process 200 proceeds to S216, and the individual file stream 404 is ignored.

When, in S220 the file structure is well-formed, the file stream 404 is passed to the file size checker module 122, and it is determined in S222 whether the size of the file stream 404 is less than a threshold level. In one or more embodiments, the threshold level may be set by a system administrator, the application server or any other suitable party. The threshold level may be a level for individual file streams 404 in the main input stream 402. Limiting the size of the file stream may prevent large files from being uploaded to the application server 108, and crashing the application server 108 by consuming all of the disk space. In some embodiments, the threshold level may be set for the entire compressed file, such that the sum of the sizes of the individual files may not exceed the threshold level. In some embodiments, the size may be based on the type of file. For example, a pdf file may not exceed 1.2 MB, while an exe file may not exceed 1 MB. When the size of the individual file stream 404 exceeds the threshold level in S222, the process 200 proceeds to S216, and the individual file stream 404 is ignored, and the process returns to S212 for the next file in the input stream 402. As a non-exhaustive example, the threshold level may be set to 1 MB, and if any of the file input streams exceeds 1 MB, the file input stream that exceeds 1 MB is discarded.

When in S222, the size of the individual file stream 404 is less than the threshold level, the file stream 404 may be transmitted and written to the storage device 110 for storing. It is noted that when the decompression module 114 is being executed, the decompression module 114 is reading the individual file streams 404 from an in-memory database allocated to the application server, as opposed to writing the file streams 404 to the physical storage device 110, where they may be used by the applications executing on the storing the cloud storage system 106. After the file stream 404 is stored in the storage device 110, the corresponding file 131 may be used during the execution of the application. As a non-exhaustive example, a user may want to update his profile picture and his personal details. To that end, the user creates an XML file with his personal details, zips the picture and XML and uploads it. If the zipped input stream on the application server validates the stream via the decompression module 114 and process 200 described above, then the picture and XML are written to the disk on the application server. The application server may then use this picture to update the user profile picture and may use the XML to update the user personal details.

Figure 5:
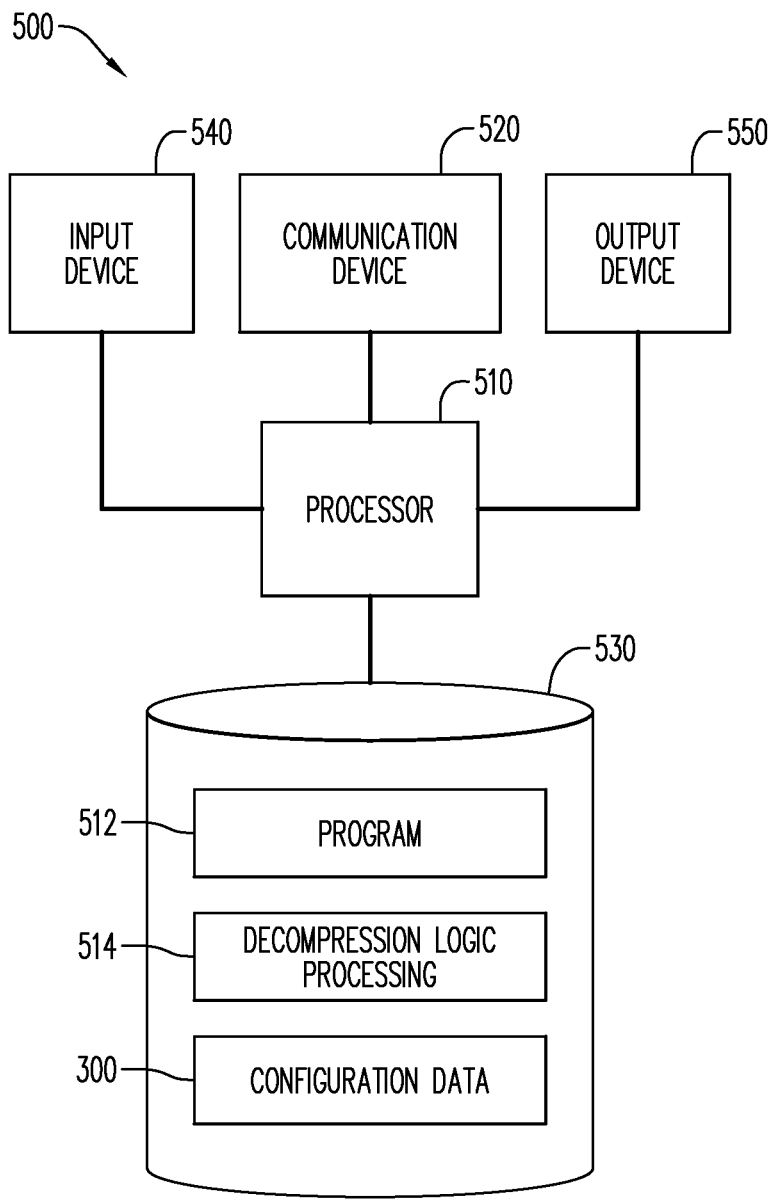
FIG. 5 is a block diagram of a system according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 100. Apparatus 500 may include other unshown elements according to some embodiments.

Apparatus 500 includes decompression processor 510 operatively coupled to communication device 520, data storage device 530, one or more input devices 540, one or more output devices 550 and memory 560. Communication device 520 may facilitate communication with external devices, such as application server 108. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The storage device 530 stores a program 512 and/or decompression platform logic 514 for controlling the processor 510. The processor 510 performs instructions of the programs 512, 514, and thereby operates in accordance with any of the embodiments described herein, including but not limited to process 200.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
   receiving a main input stream for a compressed file at an application server, wherein the main input stream includes two or more file streams;
   reviewing each of the two or more file streams of the received main input stream individually, wherein reviewing each file stream individually further comprises:
   after receipt at the application server:
      extracting a file-type extension from each file stream of the two or more file streams of the received main input stream;
      determining the file-type extension is supported;
      determining, for each file stream with the supported file-type extension, a signature for the file stream with the supported file-type extension is valid;
      determining, for each valid file stream, a size of the file is less than a threshold level; and
      storing the valid file stream on a storage device when the size of the file is less than the threshold level.

2. The method of claim 1, wherein the compressed file remains compressed through storing the file streams in the input stream.

3. The method of claim 1, further comprising:
   analyzing a syntax of the valid file stream prior to determining the size of the file.

4. The method of claim 3, wherein analyzing the syntax of the valid file stream further comprises:
   parsing the file stream to validate a structure of the file.

5. The method of claim 1, further comprising:
   providing a platform, wherein the file-type extension is supported by the platform executing on the application server.

6. The method of claim 1, wherein the signature is based on the file type.

7. The method of claim 1, wherein determining the file-type extension is supported further comprises:
   comparing the extracted file-type extension to a configuration file that specifies the supported file-types.

8. The method of claim 1, wherein the signature includes a unique character pattern for each type of file.

9. A system comprising:
   a main input stream source;
   an application server;
   a decompression module including a file extension module, a file content type detector module, a file syntactic analyzer module, and a file size checker module;
   a storage device; and
   a decompression processor in communication with the decompression module and operative to execute processor-executable process steps to cause the system to:
      receive a main input stream for a compressed file at the application server, wherein the input stream includes two or more file streams;
      review each of the two or more file streams of the received main input stream individually, wherein the review of each file stream individually further comprises:
         after receipt at the application server:
            extraction, via the file extension module, of a file-type extension from each file stream of the two or more file streams of the received main input stream;
            determination that the file-type extension is supported;
            determination, via the file content type detector module, that a signature for the file stream with the supported file-type extension is valid;
            determination, via the file size checker module, that a size of the file is less than a threshold level; and
            storage of the valid file stream on the storage device when the size of the file is less than the threshold level.

10. The system of claim 9, wherein the compressed file remains compressed through storing the file.

11. The system of claim 9, wherein the decompression module further comprises a file syntactic analyzer module operative to execute processor-executable steps to cause the system to:
    analyze a syntax of the valid file stream prior to determining the size of the file.

12. The system of claim 1, wherein the valid file syntactic analyzer module includes a parser, and wherein analyzing the syntax of the file stream further comprises processor-executable steps to cause the system to:
    parse, via the parser, the file stream to validate a structure of the file.

13. The system of claim 9, further comprising:
    a platform, wherein the file-type extension is supported by the platform executing on the application server.

14. The system of claim 9, wherein the signature is based on the file type.

15. The system of claim 9, wherein determining the file-type extension is supported further comprises processor-executable steps to:
    compare the extracted file-type extension to a configuration file that specifies the supported file-types.

16. The system of claim 9, wherein the signature includes a unique character pattern for each type of file.

17. A non-transitory computer-readable medium storing program code, the program code executable by a computer system to cause the computer system to:
- receive a main input stream for a compressed file at the application server, wherein the input stream includes two or more file streams;
- review each of the two or more file streams of the received main input stream individually, wherein the review of each file stream individually further comprises:
  - after receipt at the application server:
    - extraction, via the file extension module, of a file-type extension from each file stream of the two or more file streams of the received main input stream;
    - determination that the file-type extension is supported;
    - determination, via the file content type detector module, that a signature for the file with the supported file-type extension is valid;
    - determination, via the file size checker module, that a size of the valid file is less than a threshold level; and
  - storage of the file stream on a storage device when the size of the file is less than the threshold level.

18. The medium of claim 17, wherein the compressed file remains compressed through storing the file.

19. The medium of claim 17, further comprising program code executable by the computer system to cause the system to:
- analyze a syntax of the valid file prior to determining the size of the file.

20. The medium of claim 19, wherein analyzing the syntax of the valid file further comprises program code executable by the computer system to cause the system to:
- parse the file stream to validate a structure of the file.

* * * * *